United States Patent Office 2,763,596
Patented Sept. 18, 1956

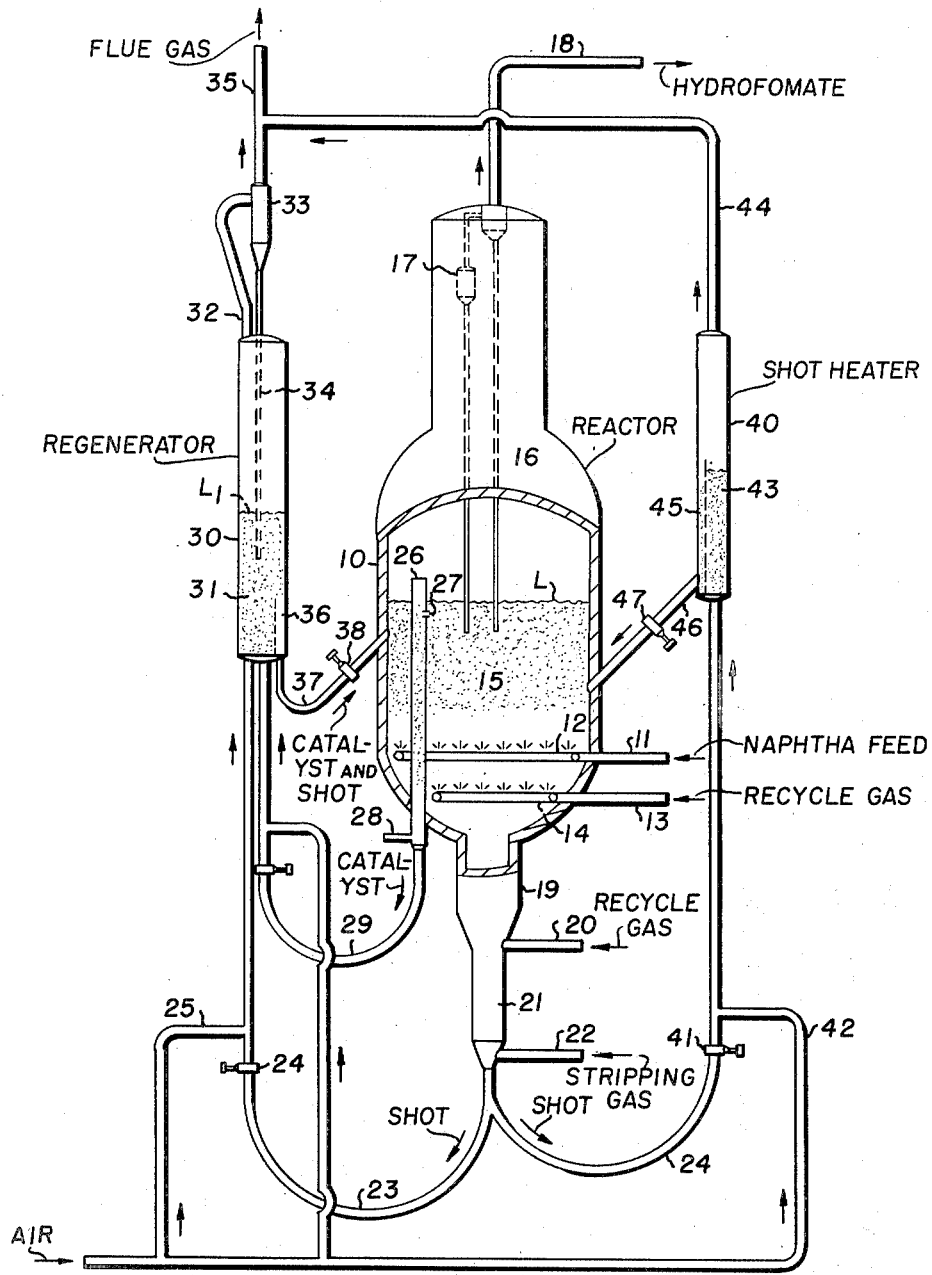
George F. Feldbauer
Edward J. Gornowski  Inventors

2,763,596

FLUID HYDROFORMING PROCESS

George F. Feldbauer and Edward J. Gornowski, Cranford, N. J., assignors to Esso Research and Engineering Company, a corporation of Delaware Application July 28, 1953, Serial No. 370,794

4 Claims. (Cl. 196—50)

This invention pertains to the catalytic conversion of hydrocarbons and more particularly to the catalytic reforming or hydroforming of hydrocarbon fractions boiling within the motor fuel or naphtha range of low knock rating into high octane number motor fuels rich in aromatics by the fluidized solids technique.

Hydroforming is a well known process for treating hydrocarbon fractions boiling within the motor fuel or naphtha range to upgrade or increase the aromaticity and improve the anti-knock and engine cleanliness characteristics of such fractions. By hydroforming is ordinarily meant a conversion process conducted at elevated temperatures and pressures in the presence of solid catalyst particles and hydrogen whereby the hydrocarbon fraction is increased in aromaticity and in which conversion there is no net consumption of hydrogen. Hydroforming is ordinarily carried out in the presence of hydrogen or a hydrogen-rich recycle gas (i. e. at relatively high hydrogen partial pressures) in the pressure range of from about 50–1000 lbs. per sq. in. at temperatures of about 750–1150° F. and in contact with such catalysts as platinum or palladium, molybdenum oxide, chromium oxide, or, in general, oxides or sulfides of metals of groups IV–VIII of the periodic system of elements, alone, or generally dispersed or supported upon a base or spacing agent such as alumina gel, precipitated alumina, or zinc aluminate spinel.

It has now been proposed to effect the hydroforming of naphtha fractions in a fluidized solids reactor system in which the naphtha vapors are passed continuously through a dense, fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels can be designed for single rather than dual functions, (3) the reactor temperature is substantially constant throughout the reactor dense bed, and (4) the regeneration or reconditioning of the catalyst may be readily controlled.

A further advantage of the foregoing fluidized solids technique has been the fact that the freshly regenerated catalyst can be utilized to carry part of the heat required for the hydroforming operation from the regeneration zone into the reaction zone. It has been proposed in this connection to discharge hot, freshly regenerated catalyst particles into a stream of hot, hydrogen-rich recycle gas in a transfer line whereby the catalyst particles are subjected to a reconditioning treatment during their passage through the transfer line into the reactor. This reconditioning or pretreatment of the regenerated catalyst particles involves at least a partial reduction of higher catalytic metal oxides formed during regeneration to a lower, more catalytically active form of catalytic metal oxide. In view of the high temperatures of the regenerated catalyst (1050–1200° F.) and the exothermic character of the reduction or reaction between the regenerated catalyst and the hydrogen, it is necessary to make the transfer line very short and of small diameter in order to keep the time of contact of the freshly regenerated catalyst and hydrogen sufficiently short to avoid over-reduction and/or thermal degradation of the catalyst.

It has been proposed to alleviate this problem by mixing recycle reactor catalyst with the freshly regenerated catalyst to lower and control the temperature of pretreatment while simultaneously recovering the sensible heat of the regenerated catalyst as well as the heat released by the partial reduction of the catalytic metal oxides for use in the hydroforming reaction zone. Although this expedient permits recovery of a substantial amount of heat for use in the hydrocarbon conversion or hydroforming reaction, the total amount of heat that can be recovered and supplied to the reaction zone by the catalyst is limited by the low catalyst to oil ratios that must ordinarily be maintained in hydroforming reactions because of selectivity considerations. Since the amount of heat released in the regenerator is so great that the catalyst is incapable of transferring it to the reaction zone at the low catalyst to oil ratios, it is common practice to arrange cooling coils in the regenerator to remove heat generated over and above that which can be safely transferred to the reactor by the catalyst. It is therefore necessary to supplement the heat supplied by the catalyst and this is done by preheating the feed stock and recycle or hydrogen-rich process gas to temperatures well above the average reactor temperature. This preheating has an adverse effect upon the yield of liquid products since it brings about thermal degradation of the feed as well as some of the higher molecular weight constituents of the recycle gas. Moreover, excessively large amounts of recycle gas must be introduced to carry heat into the reaction zone and the cost of this extra compressor and heat exchanger capacity adds very substantially to the total cost of the plant.

It is the object of this invention to provide the art with an improved method and apparatus for reforming hydrocarbon fractions by the fluidized solids technique.

It is also the object of this invention to provide the art with a simple economical fluid hydroforming reactor system in which inert heat transfer solids are circulated between the reaction zone and the regeneration zone to transfer heat from the regeneration zone to the reaction zone, while further amounts of inert heat transfer solids are circulated to a heater wherein they are heated by burning an extraneous fuel whereupon the heated solids are returned to the reaction zone.

These and other objects will appear more clearly from the detailed specification and claims which follow.

It has now been found that a heat-balanced hydroforming operation, i. e., an operation in which the heat released in the regenerator is transferred to the hydroforming reaction can be carried out in a simple but highly effective manner.

In accordance with the present invention, a settling vessel or elutriating section is appended to the bottom of the reactor vessel to effect the separation of relatively large, high density heat transfer solids from finely divided catalyst and a stripping section is appended to the bottom of the elutriating section for stripping the heat transfer solids substantially free of finely divided catalyst particles and entrained gaseous materials. The stripping section is made of relatively small diameter so that the stripping gas velocity can be high enough to refluidize the large heat transfer solids so that they may be conveyed by a dense phase riser to the heater vessel and/or to the catalyst regenerator vessel. Recycle gas is supplied to the lower part of the elutriating section at a rate high enough to fluidize the largest catalyst particles but not high enough to fluidize the shot or inert heat transfer solids while stripping gas, preferably natural or fuel gas, is supplied to the bottom of the stripping section at a higher velocity to strip off any remaining catalyst particles and refluidize the heat transfer solids. A stream of stripped heat transfer solids is then passed through a dense phase riser into a burner where it is heated by burning a suitable fuel preparatory to recycling to the reactor. A second stream of the heat transfer solids is transferred through another dense phase riser to the regenerator for absorption of excess heat released in the regeneration of the catalyst. Spent catalyst is supplied to the regenerator separately from the heat transfer solids but the regenerated catalyst and heat transfer solids are preferably recycled from the regenerator to the reactor as a mixture.

Reference is made to the accompanying drawing illustrating a diagrammatic flow plan of a system in accordance with the present invention.

Referring to the drawing, the system comprises a reactor vessel 10 and a regenerator vessel 30 and a burner or shot heater vessel 40 suitably connected to each other for continuous circulation of solids as will be described below. Feed stock or naphtha suitably preheated is supplied through line 11 to a distributor ring or the like 12 while hot recycle gas is supplied to reactor vessel 10 through inlet line 13 and distributor ring 14 arranged in the lower part of the reactor vessel. Although the feed and the recycle gas are shown as entering the reactor separately, it is also possible and in some cases it may be preferable to introduce the feed and the recycle gas together. When supplied separately as shown, the fresh feed is ordinarily introduced at a higher level in the reactor than the recycle gas. The reactor vessel 10 is charged with finely divided catalyst particles and inert heat transfer solids or shot which are maintained as a dense fluidized liquid simulating mass or bed 15 having a definite level L or interface separating the dense, fluidized bed 15 from a disperse or dilute phase 16 comprising small amounts of solid particles entrained in the vaporous reaction products. The reaction products pass overhead from the reactor dense bed 15 and are passed through a cyclone separator 17 or the like in order to free them of most of the solid particles that are entrained therewith. The separated catalyst particles are returned to the reactor dense bed through the dip leg attached to the bottom of the cyclone separator 17. Reaction products substantially free of catalyst or other solid particles are removed through product outlet line 18 to suitable product recovery, stabilizing and/or storage equipment.

Suitable catalysts for charging to the reactor vessel 10 are platinum and palladium or group VI metal oxides such as molybdenum oxide, chromium oxide, tungsten oxide, vanadium oxide or the like or mixtures thereof upon a carrier such as alumina gel, activated alumina, zinc aluminate spinel or the like. The catalyst particles should, for proper fluidization, be between about 200 and 400 mesh in size or, about 0 to 200 microns in diameter with a major proportion between about 20 and 80 microns.

The inert, heat transfer solids or shot are preferably coarser and/or of greater density than the catalyst used in the process. Suitable materials for use as inert, heat transfer solids are corundum, mullite, fused alumina, fused silica or the like. It is necessary that the heat transfer solids have no adverse effects upon the catalytic reaction or hydroforming process and that they be stable or resistant to breakdown due to the temperature and mechanical action to which they are subjected in the process. The size of the heat transfer solids or shot is of critical importance and must be determined by the proportions of the catalyst bed and the desired operating conditions for the system. The heat transfer solids may vary from about 300 to 500 microns in diameter and are preferably in the shape of spherical or spheroidal particles. The inert particles are of as large a diameter as may be used and still obtain proper fluidization in the transfer lines and in the regenerator.

Vapor velocities in the reactor are such as to permit the inert heat transfer solids to move downwardly in vessel 10 past the feed and recycle gas inlets into shot elutriating section or vessel 19 connected to the bottom of vessel 10. The shot elutriating section or vessel 19 is substantially smaller in cross sectional area than the main reactor vessel 10. For example, the diameter of the shot elutriating vessel 19 should be less than about one half the diameter of the main reactor vessel 10. An inlet line 20 is connected to the bottom of the shot elutriating vessel 19 in order to supply recycle gas thereto. In the elutriating section 19, the gas velocity is kept sufficiently high to fluidize and entrain the largest particles of catalyst but not high enough to fluidize the shot. By maintaining the heat transfer solids or shot in a non-fluid state in elutriating section 19, countercurrency between gas and heat transfer solids is obtained without resorting to baffles in a vessel having a low $L/D$ ratio. This type of operation is possible because of the large difference in fluidization characteristics of the catalyst and shot, catalyst having a nominal particle size of 80 microns having a minimum fluidization velocity of about 0.1 ft./sec. while shot or heat transfer solids having a nominal particle size of 400 microns have a minimum fluidization velocity of about 0.4 ft./sec. Accordingly, gas velocities of about 0.3 ft./sec. through section 19 may be used.

The inert heat transfer solids or shot substantially free of catalyst particles are discharged from the bottom of elutriating section 19 into the upper part of stripping and shot fluidizing section 21 of substantially smaller cross sectional area than elutriating section 19. Stripping gas, preferably a fuel gas, is supplied to section 21 through inlet line 22 at a sufficient rate to fluidize the shot or heat transfer solids. The fluidized shot are discharged from the bottom of section 21 into a dense phase transfer line, preferably having a branch 23 for transfer of shot to regenerator 30 and a branch 24 for transferring shot to shot heater or burner 40. The flow of shot through branch 23 is controlled by slide valve 24 and the shot is discharged, in admixture with air supplied through line 25 into the bottom of regenerator 30. A well 26 having its upper end above the level L of the dense bed 15 is arranged in the reactor vessel and is provided with an inlet port 27 near the upper part of the bed for the discharge of spent catalyst substantially free of shot into well 26. Stripping gas such as steam, or other inert gas is supplied through line 28 and the stripped spent catalyst is discharged from the bottom of well 26 through valve controlled transfer line 29 into regenerator 30. Carbonaceous deposits are burned off the catalyst particles in regenerator 30 by the air introduced with the shot. The shot absorb the excess heat released in the regenerator. Gas velocities in regenerator 30 are sufficient to form a dense, fluidized bed of catalyst and shot 31 having a level $L'$. Off gases or combustion products are taken overhead from regenerator 30 through outlet line 32 and cyclone separator 33 for the recovery of entrained solid particles which are returned to the dense bed 31 through dip leg 34. The gases pass from cyclone separator 33 through outlet line 35 to a waste gas stack or to suitable scrubbing and/or storage equipment in the event that it is desired to utilize this gas for stripping or transport purposes in the process.

The mixture of inert heat transfer solids or shot and catalyst is withdrawn directly from the dense bed 31 in the regenerator 30 through withdrawal well 36 and is then returned to the reactor through U-bend line 37 at a rate controlled by slide valve 38. Stripping gas may be supplied to withdrawal well 36 in order to remove combustion products from the solid particles. The regenerated catalyst may be given a brief treatment with hydrogen or hydrogen-rich recycle gas in the transfer line or before discharge into the reactor. In a preferred embodiment, the catalyst in admixture with the inert heat transfer solids is returned to the reactor without pretreatment or without contact with hydrogen or hydrogen-rich recycle gas. In this way, reduction or partial reduction of the oxidized catalyst is effected in the reactor itself at reactor temperature which obviates the danger of overpretreatment or thermal degradation of the catalyst and in the presence of the total volume of reactant and diluent vapors which serves to minimize the effect of water formed as a result of the reaction of hydrogen with the catalytic metal oxide.

The stream of inert heat transfer solids passing through branch line 24 at a rate controlled by slide valve 41 is mixed with air supplied through line 42 and discharged into burner or shot heater 40. If the fuel gas entrained with the shot is insufficient to heat the shot to the desired temperature, further fuel gas may be supplied to burner 40 for heating the shot. Gas velocities through burner 40 are sufficient to maintain the shot as a dense, fluidized bed 43. The spent gases pass overhead from burner 40 through outlet line 44 which may, in turn, be connected to the regenerator vent line 35 thereby obviating the necessity of providing a separate pressure release system for the off gases from the burner. The heated shot pass from dense bed 43 into withdrawal well 45 and are passed thence through transfer line 46 and slide valve 47 into the reactor vessel 10. Stripping gas can be supplied to the lower part of withdrawal well 45 or transfer line 46 in order to strip off any residual entrained combustion gases.

The feed or charging stock to the hydroforming reactor may be a virgin naphtha, a cracked naphtha, a Fischer-Tropsch naphtha or the like having a boiling range of from about 125 to 450° F. or it may be a narrow boiling cut from within this range. The feed stock is preheated alone or in admixture with recycle gas to reaction temperature or to the maximum temperature possible while avoiding thermal degradation of the feed stock. Ordinarily, preheating of the feed stock is carried out to about 800–1000° F., preferably about 950° F. Thermal degradation of the feed naphtha at preheat temperatures can be avoided or minimized by limiting the time of residence in the heating coils, transfer and feed inlet lines.

The recycle gas which generally contains 50 volume per cent hydrogen or more is preheated to temperatures of about 1000–1200° F. in suitable preheat coils. The recycle gas may be circulated through the reactor at a rate of about 1000 to 8000 cu. ft. per barrel of naphtha feed. Since the shot circulated through the reaction zone is capable of supplying the major part of the heat of reaction, the amount of recycle gas may be kept at the minimum amount which will suffice to keep carbon deposition at a satisfactory low level.

The reactor system is charged with a mass of finely divided hydroforming catalyst particles. Suitable catalysts include platinum or palladium or group VI metal oxides such as molybdenum oxide, chromium oxide, tungsten oxide or vanadium oxide or mixtures thereof upon a carrier such as activated alumina, alumina gel or zinc aluminate spinel. Preferred catalysts contain from about 0.05 to 2.0 wt. per cent platinum upon alumina, preferably alumina produced by the hydrolysis of an aluminum alcoholate or from 5 to 15 wt. per cent molybdenum oxide or from about 10 to 40 wt. per cent chromium oxide upon a suitable support such as alumina or zinc aluminate spinel. If desired, minor amounts of stabilizers and promoters such as silica, calcium oxide, ceria, potassia, zirconia or the like can be included in the catalyst. The catalyst particles are, for the most part between 200 and 400 mesh in size or about 0–200 microns in diameter with a major proportion between 20 and 80 microns.

The heat transfer solids, or shot, are preferably inert in the process and should be coarser and/or of greater density than the catalyst used in the process. Suitable materials as inert heat transfer solids are corundum, mullite, fused alumina (alpha alumina), fused silica or metal shot or particles of iron, stainless steel, monel or the like. It is necessary that the heat transfer material or shot have no adverse effects upon the catalytic reaction or hydroforming process and that they be stable or resistant to breakdown due to the temperature mechanical action to which they are subjected in the process. The heat transfer solids may vary from about 300 to 500 microns in diameter and are preferably in the shape of spheres or spheroids. The heat transfer solids are of as large a diameter as may be used and still obtain proper fluidization in the transfer lines, the regenerator and in the shot heater or burner.

The hydroforming reactor vessel is operated at temperatures between about 850 and 1000° F., preferably at about 900–950° F. and at pressures of about 50–1000 lbs. per sq. inch, preferably about 200 lbs. per sq. inch. Small water partial pressure (approximately 0.1 to about 10 mol per cent) is maintained in the reaction zone due principally to the presence of water in the feed and in the recycle gas and also due to the formation of water in the regeneration as well as in the reduction or pretreatment of the regenerated catalyst. This small water partial pressure permits operation at somewhat higher temperatures without loss in selectivity than is possible in systems lacking this water partial pressure.

The regenerator and shot heater or burner are operated at essentially the same pressure as the hydroforming reactor vessel. The shot heater or burner is operated at temperatures of about 1100–1400° F. and the regenerator at lower temperatures of about 1000–1150° F., sufficiently low as to avoid any danger of thermally degrading the catalyst. The average residence time of the catalyst in the reactor is of the order of from about 3 to 4 hours while the average residence time of the catalyst in the regenerator is of the order of from 3 to 15 minutes. The average residence time of the inert heat transfer solids in the reaction zone is of the order of about 20 minutes to one hour and in the regenerator or in the shot heater or burner of about 3 to 15 minutes.

The weight ratio of catalyst to oil introduced into the reactor should ordinarily be about 0.5 to about 3.5, although catalyst to oil ratios of 0.1 and less may be used with platinum catalysts. It is ordinarily preferable to operate at catalyst to oil ratios of about 1.0 since higher ratios tend to give higher or excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

The foregoing description contains a limited number of embodiments of the present invention. It will be understood, however, that this invention is not limited thereto since numerous variations are possible without departing from the scope of this invention.

What is claimed is:

1. In a method of reforming hydrocarbon fractions boiling within the naphtha range in contact with a mixture of a major proportion of finely divided reforming catalyst particles and a minor proportion of inert heat transfer solid particles in a dense, fluidized bed, the improvement which comprises discharging a mixture of inert solids and catalyst into an elutriating zone, passing fluidizing gas through said elutriating zone at a lower rate than the minimum fluidizing velocity for the inert solids but above the minimum fluidizing velocity for the catalyst particles discharging inert solids substantially free from catalyst particles from the bottom of the elutriating zone into a stripping zone, passing a stripping gas through said stripping zone at a sufficient velocity to fluidize the inert solids, transferring the fluidized inert solids from the bottom of said stripping zone to a heating zone and recycling the heated inert heat transfer solids to the reaction zone.

2. In a method of reforming hydrocarbon fractions boiling within the naphtha range in contact with a mixture of a major proportion of finely divided reforming catalyst particles and a minor proportion of inert heat transfer solid particles in a dense, fluidized bed, the improvement which comprises discharging a mixture of inert heat transfer solids and catalyst into an elutriating zone, passing fluidizing gas through said elutriating zone at a lower rate than the minimum fluidizing velocity for the inert solids but above the minimum fluidizing velocity for the catalyst particles, discharging inert solids substantially free from catalyst particles from the bottom of the elutriating zone into a stripping zone, passing a stripping gas through said stripping zone at a sufficient velocity to fluidize the inert heat transfer solids, transferring part of the fluidized inert solids from the bottom of said stripping zone to a heating zone and recycling the heated inert heat transfer solids to the reaction zone, transferring the remainder of the inert solids from the bottom of said stripping zone to a regeneration zone, continuously withdrawing a stream of spent catalyst particles from the upper portion of the dense fluidized bed in the reaction zone and transferring the withdrawn spent catalyst to said regeneration zone, burning carbonaceous deposits from the spent catalyst in admixture with inert heat transfer solids in said regeneration zone and recycling the mixture of inert solids and regenerated catalyst to the reaction zone.

3. In a method of reforming hydrocarbon fractions boiling within the naphtha range in contact with a mixture of a major proportion of finely divided reforming catalyst particles and a minor proportion of inert heat transfer solid particles in a dense, fluidized bed, the improvement which comprises discharging a mixture of inert solids and catalyst into an elutriating zone, passing fluidizing gas through said elutriating zone at a lower rate than the minimum fluidizing velocity for the inert solids but above the minimum fluidizing velocity for the catalyst particles discharging inert solids substantially free from catalyst particles from the bottom of the elutriating zone into a stripping zone, passing a fuel gas through said stripping zone at a sufficient velocity to fluidize the inert solids, transferring the fluidized inert solids from the bottom of said stripping zone to a heating zone, burning fuel gas in contact with said inert solids in order to heat the same, and recycling the heated inert heat transfer solids to the reaction zone.

4. In a method of reforming hydrocarbon fractions boiling within the naphtha range in contact with a mixture of a major proportion of finely divided reforming catalyst particles and a minor proportion of inert heat transfer solid particles in a dense, fluidized bed, the improvement which comprises discharging a mixture of inert heat transfer solids and catalyst into an elutriating zone, passing fluidizing gas through said elutriating zone at a lower rate than the minimum fluidizing velocity for the inert solids but above the minimum fluidizing velocity for the catalyst particles, discharging inert solids substantially free from catalyst particles from the bottom of the elutriating zone into a stripping zone, passing a fuel gas through said stripping zone at a sufficient velocity to fluidize the inert heat transfer solids, transferring part of the fluidized inert solids from the bottom of said stripping zone to a heating zone, burning fuel gas in contact with said inert solids in order to heat the same, and recycling the heated inert heat transfer solids to the reaction zone, transferring the remainder of the inert solids from the bottom of said stripping zone to a regeneration zone, continuously withdrawing a stream of spent catalyst particles from the upper portion of the dense fluidized bed in the reaction zone and transferring the withdrawn spent catalyst to said regeneration zone, burning carbonaceous deposits from the spent catalyst in admixture with inert heat transfer solids in said regeneration zone and recycling the mixture of inert solids and regenerated catalyst to the reaction zone.

References Cited in the file of this patent

UNITED STATES PATENTS

| | | |
|---|---|---|
| 2,393,636 | Johnson | Jan. 29, 1946 |
| 2,446,247 | Scheineman | Aug. 3, 1948 |
| 2,483,485 | Barr | Oct. 4, 1949 |